(12) United States Patent
Cattaneo (10) Patent No.: US 10,865,821 B2
(45) Date of Patent: Dec. 15, 2020

(54) JOINING DEVICE WITH WIDE ACCESSIBILITY FOR PARTS OF FURNITURE AND FURNISHING ITEMS

(71) Applicant: Leonardo S.r.l., Figino Serenza (IT)

(72) Inventor: Carlo Cattaneo, Figino Serenza (IT)

(*) Notice: Subject to any disclaimer, the term of this patent is extended or adjusted under 35 U.S.C. 154(b) by 376 days.

(21) Appl. No.: 15/751,847

(22) PCT Filed: Oct. 5, 2016

(86) PCT No.: PCT/EP2016/073787
§ 371 (c)(1),
(2) Date: Feb. 9, 2018

(87) PCT Pub. No.: WO2017/060298
PCT Pub. Date: Apr. 13, 2017

(65) Prior Publication Data
US 2018/0238366 A1    Aug. 23, 2018

(30) Foreign Application Priority Data
Oct. 9, 2015  (IT) .......................... 102015000059878

(51) Int. Cl.
*F16B 12/20*    (2006.01)
*A47B 96/06*    (2006.01)

(52) U.S. Cl.
CPC ........ *F16B 12/2036* (2013.01); *A47B 96/066* (2013.01); *F16B 12/2063* (2013.01)

(58) Field of Classification Search
CPC . A47B 96/027; A47B 96/0669; A47B 96/066; F16B 5/008; F16B 5/0614; F16B 12/2027; F16B 12/2036; F16B 12/2054; F16B 12/2063; Y10T 403/4602; Y10T 403/553; Y10T 403/556; Y10T 403/7096; Y10T 403/73
USPC ........ 403/231, 294, 296, 382, 403, DIG. 10, 403/DIG. 12
See application file for complete search history.

(56) References Cited

U.S. PATENT DOCUMENTS 6,890,121 B2 * 5/2005 Mauri ................. F16B 12/2063
                                                                    403/231

FOREIGN PATENT DOCUMENTS

| DE | 29505752 | | 5/1995 | |
| DE | 29706887 U1 | * | 6/1997 | .......... F16B 12/2027 |
| EP | 503701 A1 | * | 9/1992 | ............. A47B 91/02 |
| WO | 2008076089 | | 6/2008 | |
| WO | WO-2009056935 A1 | * | 5/2009 | ............... F16M 7/00 |

(Continued)

*Primary Examiner* — Josh Skroupa
(74) *Attorney, Agent, or Firm* — Themis Law (57) ABSTRACT

A joining device with wide accessibility for parts of furniture and furnishing items, of a first panel to a second panel to be moved towards each other to bring an edge of the second panel abutted in a tightening position against a surface of the first panel, includes a blocking group and a connection group. The blocking group is inserted inside a seat defined within the first panel and receiving the blocking group, and includes a toothed crown, which is housed in a casing positioned in a first holing in the first panel and which controls the movement of a grub screw engaging a pin of the connection group. The casing includes a pair of half-shells that can be coupled with each other and that each contain a hole that is aligned on the two half-shells and with an additional holing of the shoulder intersecting the first holing.

7 Claims, 8 Drawing Sheets

(56) References Cited

FOREIGN PATENT DOCUMENTS

WO    WO-20091456503 A1 * 12/2009   .......... F16B 12/2027

* cited by examiner

JOINING DEVICE WITH WIDE ACCESSIBILITY FOR PARTS OF FURNITURE AND FURNISHING ITEMS

The present invention relates to a joining device with wide accessibility for parts of furniture and furnishing items.

The joining between two panels, for example between a shoulder of a piece of furniture and a base, or in any case a shelf, is currently effected in the furniture and furnishing field using various procedures and with different solutions.

Examples of these solutions are known for example from patents U.S. Pat. Nos. 7,494,297, 5,567,081, 6,547,477 and 4,408,923.

These known solutions have a certain complexity and in any case have a certain visibility, as they require closing elements of the seats or holings necessary for positioning the elements that effect the joining especially in supporting parts of the furniture and/or furnishing item.

Figure 1:
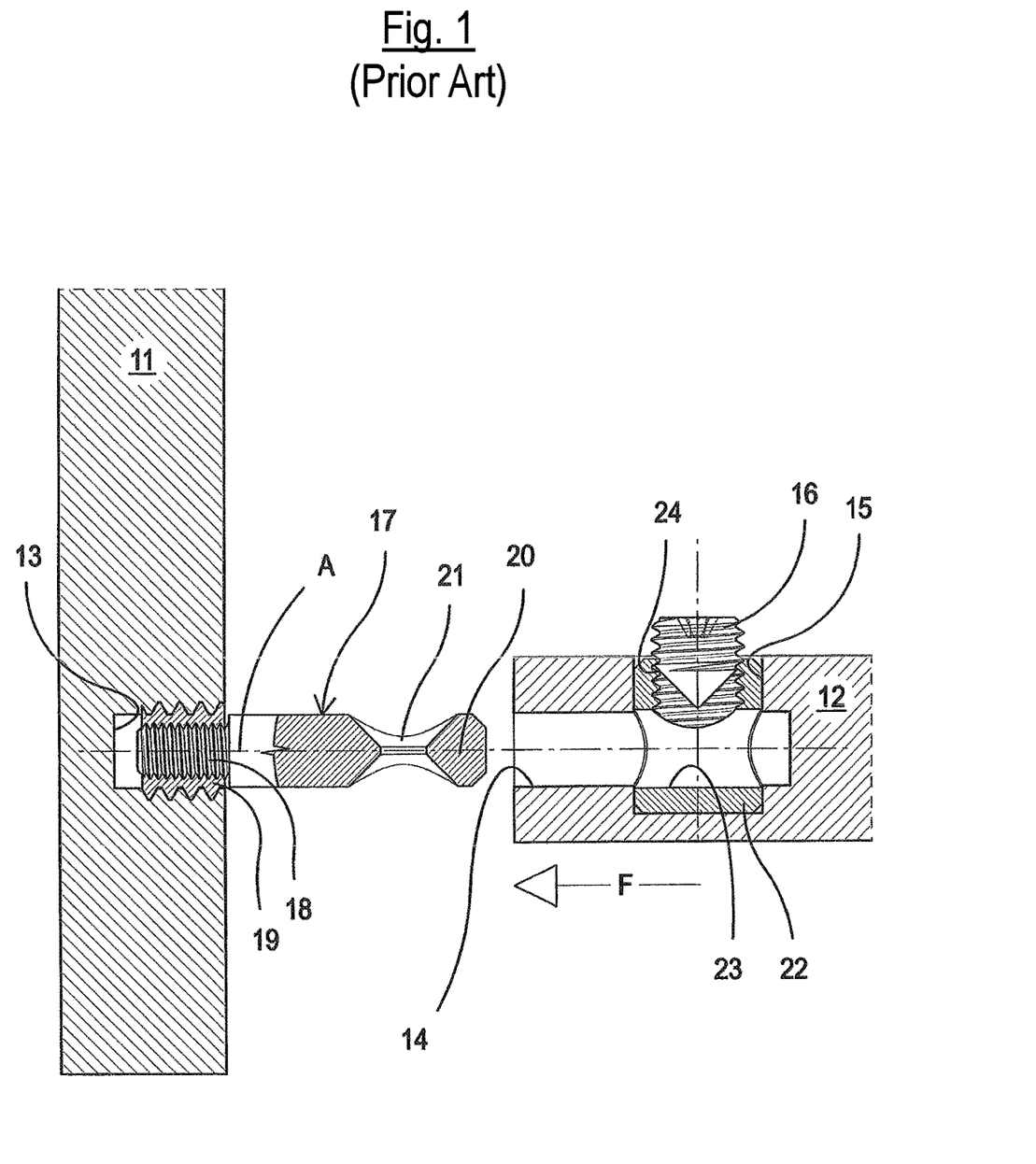
FIG. 1 is a sectional view illustrating parts, spaced from each other, of a known joining device for parts of furniture and furnishing items, for example between a shoulder of a piece of furniture and a base or in any case a shelf.
Figure 2:
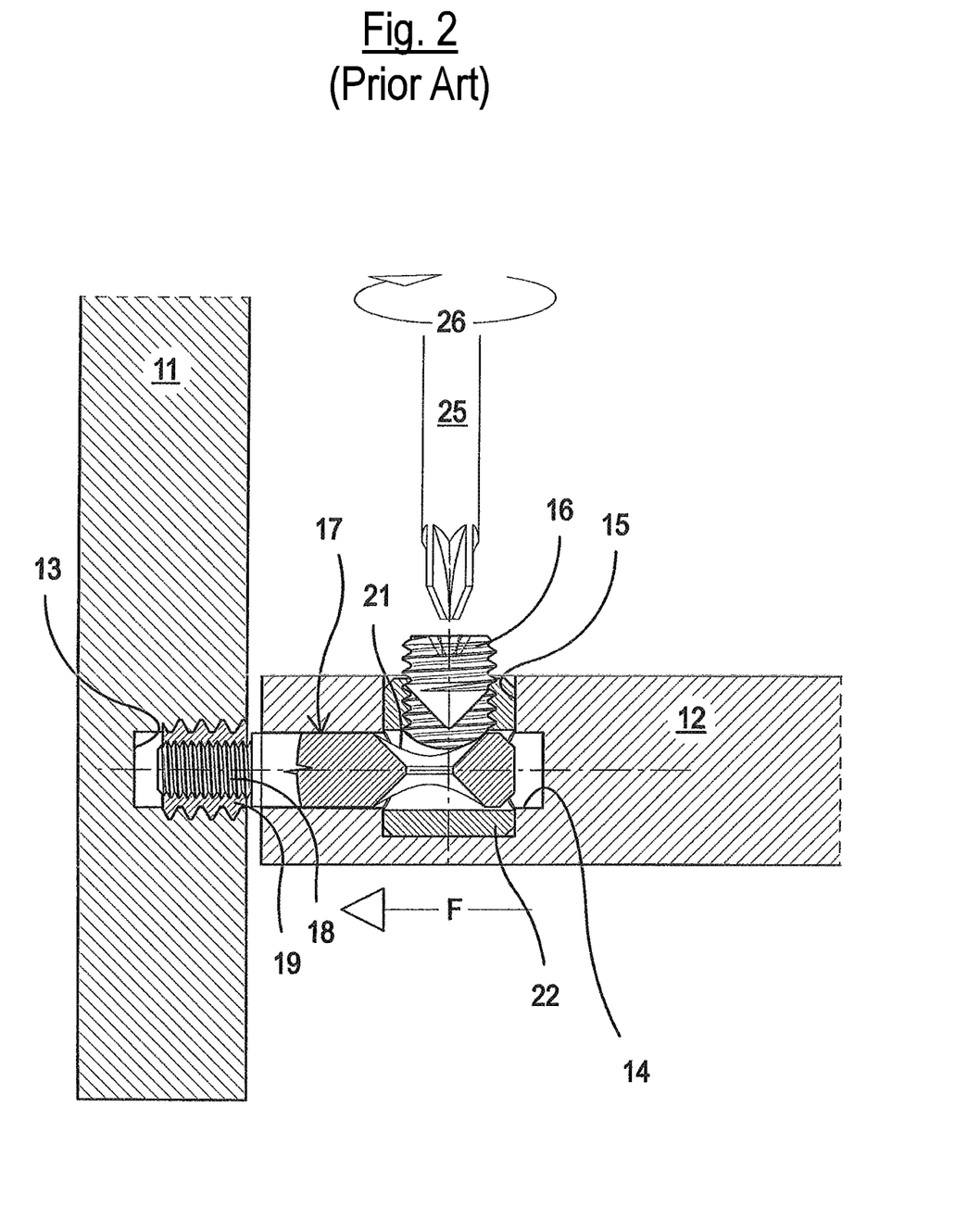
Figure 3:
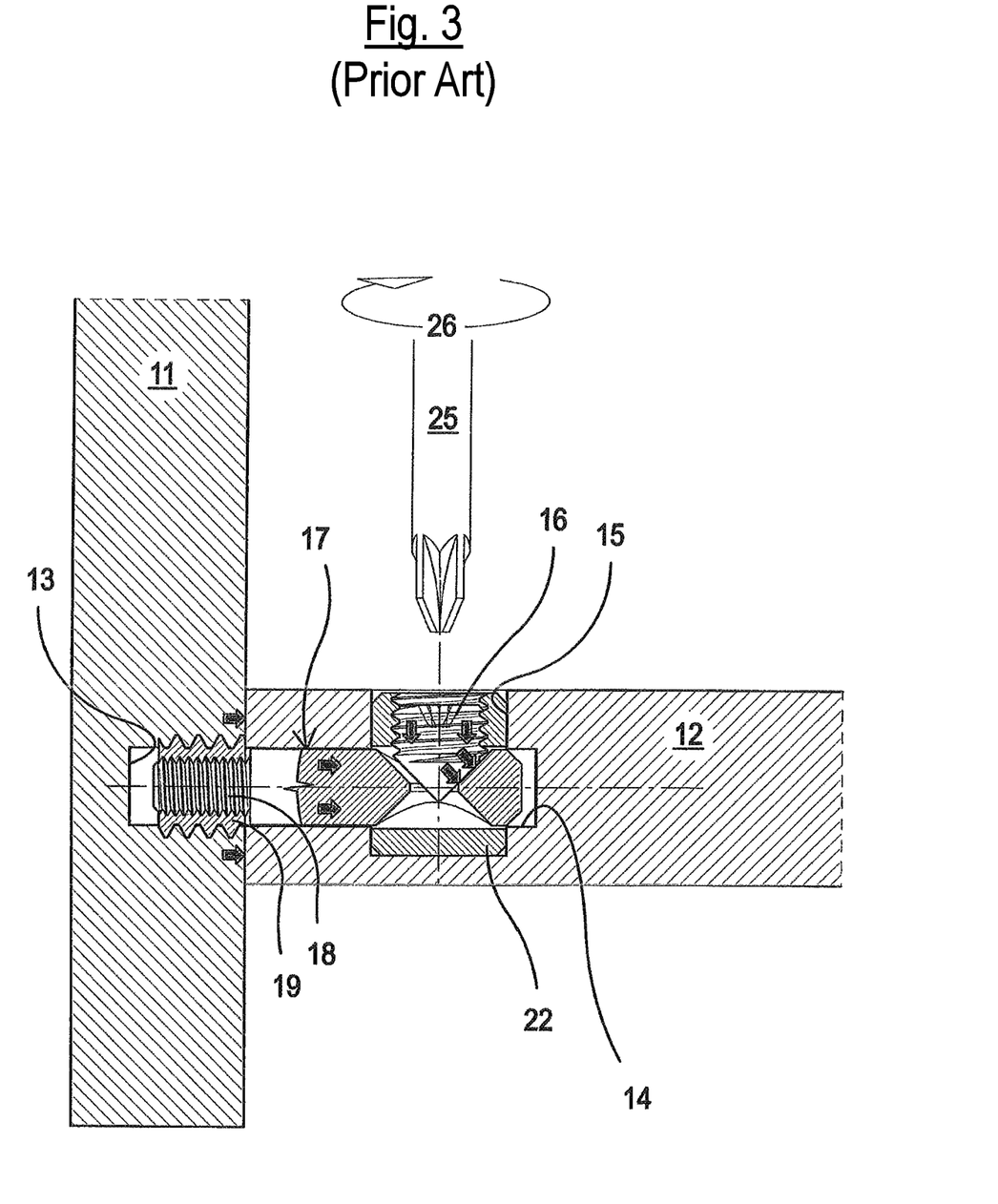

Much more simply, FIGS. 1, 2 and 3 show a known solution of a joining device for parts of furniture and furnishing items, for example between a shoulder of a piece of furniture and a base, or in any case a shelf.

In the known solution illustrated, holings must be provided in both a shoulder 11 and a base 12 of a piece of furniture, both partially shown in a connection part of the same. The shoulder 11, in fact, provides a horizontal blind holing 13 and the base 12 provides even a double holing 14, 15. More specifically, a horizontal holing 14 to be aligned with the holing 13 of the shoulder 11, and a vertical holing 15, formed in the upper surface of the base 12, which intersects the first holing 14, for the insertion of a blocking element, for example a grub screw 16, wherein both holings are blind.

Said holing 13 has an axis A which is perpendicular to the shoulder 11.

This known joining device provides the positioning of a pin 17 with a first threaded end 18 inside an internally threaded bush 19 positioned in the holing 13 of the shoulder 11. The pin 17 contains, at the other end 20, a housing 21 for an end of the grub screw 16.

A bush 22 is housed in the vertical holing 15 of the base 12, which provides a horizontal pass-through hole 23 for receiving the protruding end 20 of the pin and a vertical threaded pass-through hole 24 which receives the grub screw 16.

By thus positioning said elements forming the known joining device and juxtaposing the shoulder and the base according to the arrow F of FIG. 1, the coupling of FIG. 2 is obtained, with the pin 17 inserted in the holing 14 of the base 12 and in the bush 22.

The grub screw 16 is then screwed, with a tool 25, according to the arrow 26, into the bush 22 so that the tip of the grub screw 16 is positioned in the housing 21 provided at the free end 20 of the pin 17.

The tightening of the grub screw 16 pushes the base against the shoulder 11 forming the final stable position shown in FIG. 3.

In this known solution, the blocking group is in the base, it is arranged perpendicular to the base and to the movement or approach direction and tightening between the shoulder and base. Only the pin, with which the blocking group cooperates, is provided in the thickness of the shoulder or side panel.

Said FIG. 3 indicates, by means of a series of arrows, the scheme of forces at play between the shoulder 11 and base 12 of the piece of furniture and between the parts of the joining device.

This final position also shows how the end of the holing 15 is present on the upper surface of the base 12, which is normally covered with a closing cap (not shown).

Said holing and the corresponding cap form a visible part of the joining device.

First of all, this part does not have an aesthetically valid appearance as, although there is the presence of the cap, it shows how the joining has been effected. Furthermore, the cap itself, which is difficult to be brought specifically in line with the surface of the base, represents an obstacle for the insertion of any object, creating a protrusion, even if minimum, with respect to the upper surface of the base.

The presence of at least two holes in the base, moreover, intersecting each other, causes a weakening of the base itself that must sustain loads representing a possible cause of breakage.

Furthermore, if non-removable encumbrances are present, such as, for example, drawers, positioned in correspondence with the base, a certain difficulty of accessibility to the blocking unit is observed.

WO 2008/076089 A2 refers to embodiments of modular constructions that connect screw assemblies for the easy assembly and dismantling of construction elements such as panels.

DE 295 05 752 U1 relates to a joining system for flat elements.

The general objective of the present invention is to provide a joining device between parts of furniture and furnishing items, such as a shoulder and a base, capable of solving the drawbacks of the known art indicated above, in an extremely simple, economical and particularly functional manner.

A further objective of the present invention is to provide a joining device between parts of furniture and furnishing items, such as a shoulder and a base, which, in addition to having a minimum visibility on the part of an observer, and therefore a high aesthetical value, can be accessible from at least two sides also in the case of non-removable encumbrances positioned close to the base or shelf.

Another objective of the present invention is to provide a joining device between parts of furniture and furnishing items, such as a shoulder and a base, which, although having a wide accessibility, can be contained in the thickness of the single panel, without weakening it.

Yet another advantage of the present invention is in any case to have accessibility to the joining device also in the presence of encumbrances not easily removable from the side where the device is usually maneuvered.

The structural and functional characteristics of the present invention and its advantages with respect to the known art will appear more evident from the following description, referring to the enclosed schematic drawings which show embodiment examples of the same invention. In the drawings:

FIGS. 2 and 3 are two sectional views of the known device of FIG. 1, wherein FIG. 2 shows said parts juxtaposed with respect to each other and partially inserted in each other and FIG. 3 shows said parts completely inserted in each other and tightened;

Figure 4:
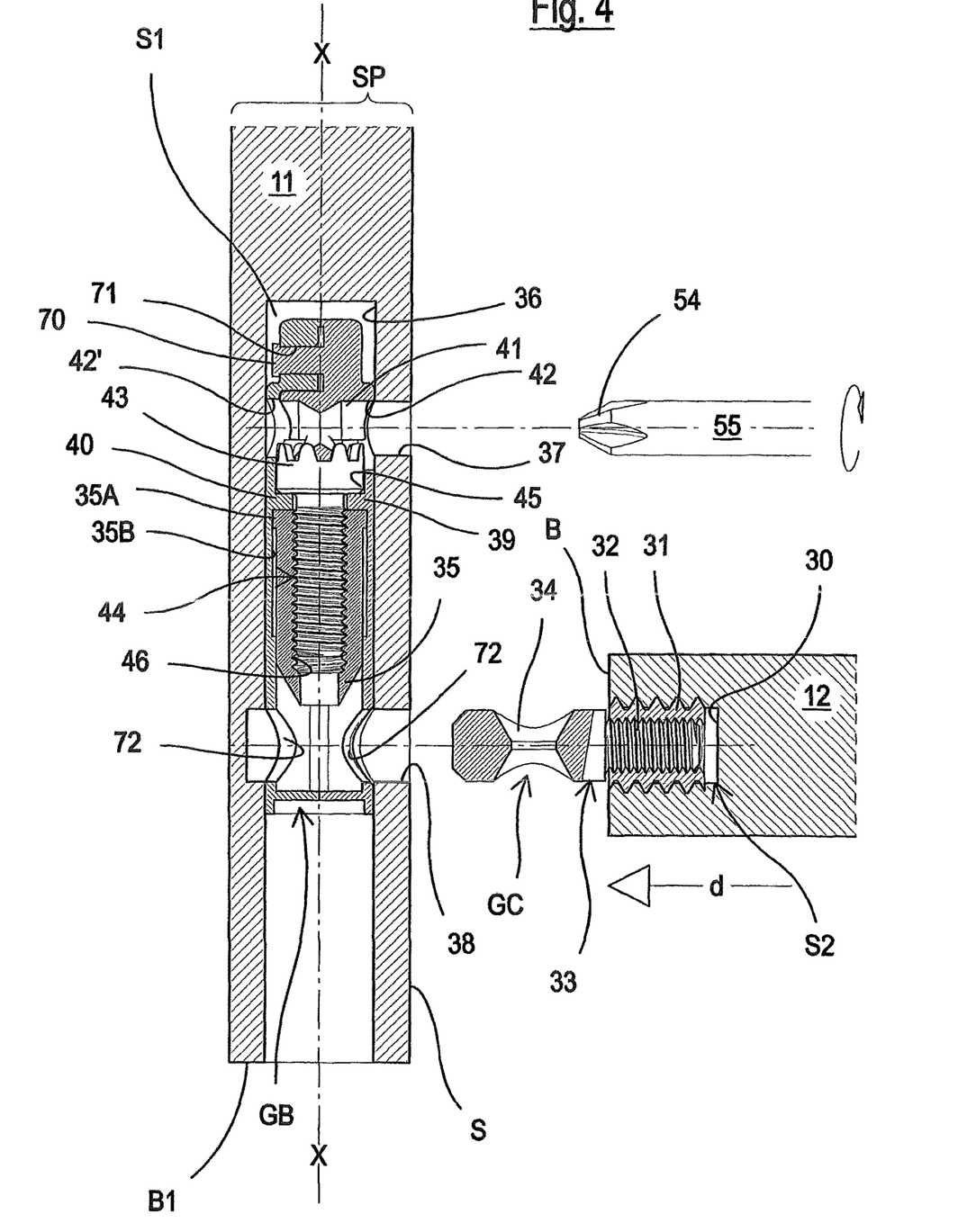
FIG. 4 is a sectional view illustrating parts, spaced from each other, of a joining device for parts of furniture and furnishing items, for example between a shoulder of a piece of furniture and a base or in any case a shelf according to the invention, in an embodiment with said parts spaced from each other.
Figure 5:
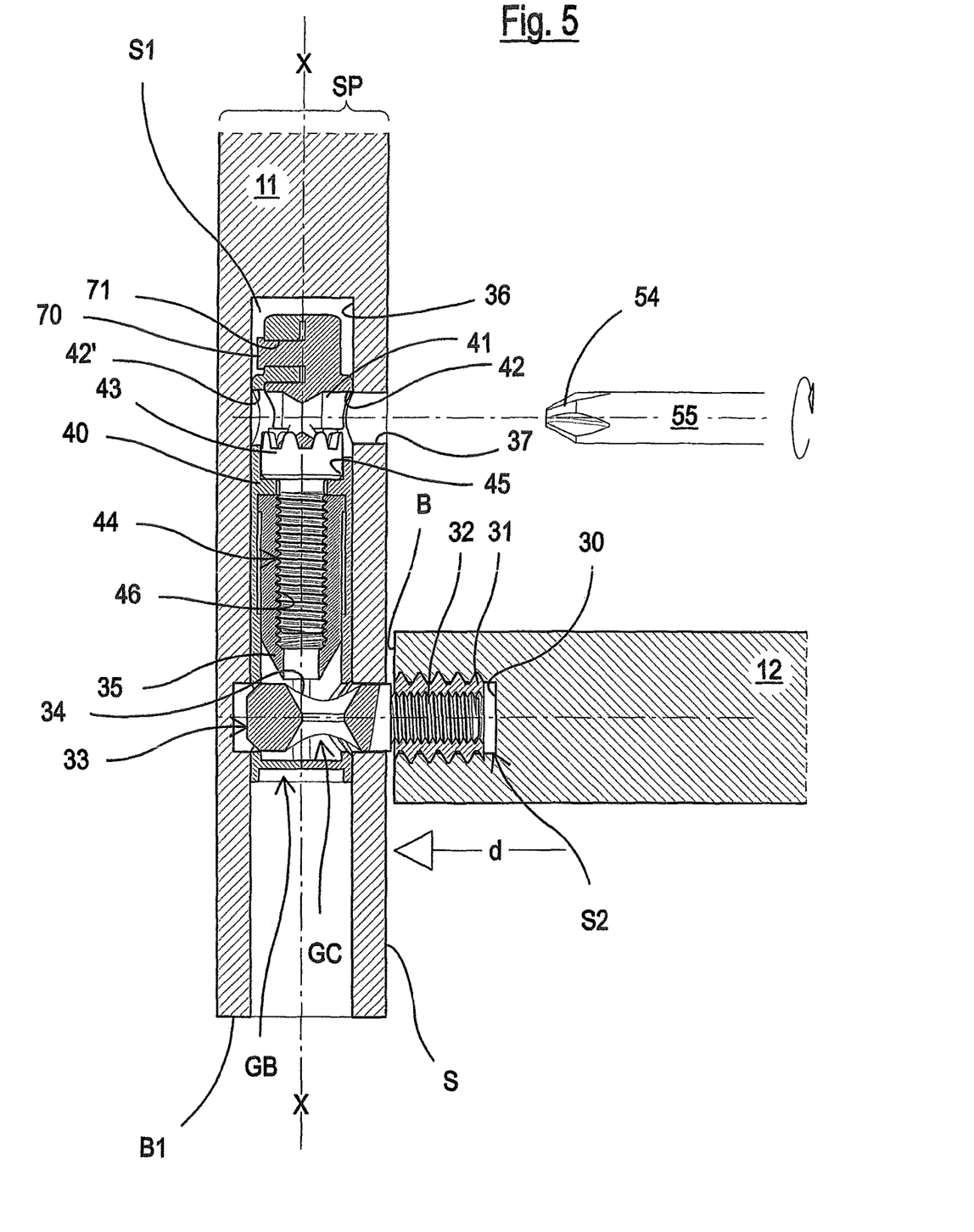
FIG. 5 is a sectional view of the device of FIG. 4 with said parts juxtaposed and partially inserted in each other.
Figure 6:
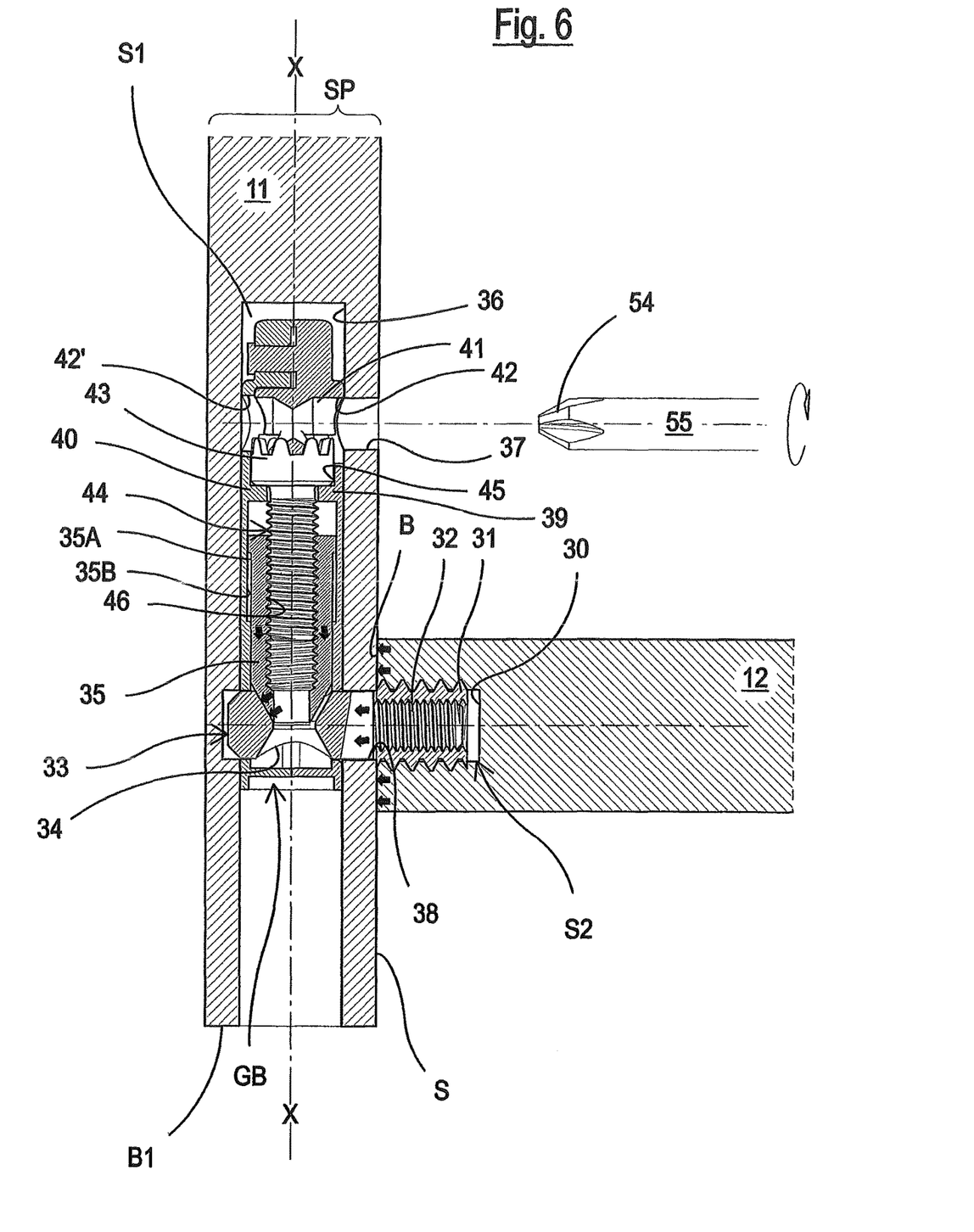
FIG. 6 is a sectional view of the device of FIG. 4 with said parts completely inserted in each other and tightened.

With reference first of all to FIGS. 4, 5 and 6, these show a first embodiment of a joining device for parts of furniture and furnishing items according to the invention. In the example, the joining device must connect and join a first panel 11, for example a shoulder 11 of a piece of furniture and a second panel 12, for example a base 12, or in any case a panel or shelf, partially shown in the figures. As illustrated in the examples, the shoulder 11 and the base or panel are generally perpendicular to each other but they may also be tilted with respect to each other.

The base 12 contains, at one of its ends, a seat S2 in the form of a horizontal blind holing 30 in which an internally threaded bush 31 is positioned for receiving a threaded end 32 of a pin 33.

In its protruding part, the pin 33 provides a housing 34 for the tip of a blocking grub screw 35.

Said pin 33 defines a connection group GC to be firmly blocked for stably interconnecting said shoulder and said base 12, as explained in greater detail hereunder.

The shoulder 11 provides a seat S1—for a blocking group GB—having a substantially elongated configuration, in the form of a vertical blind holing which intersects with a first and a second horizontal blind holing 37, 38, spaced from each other.

Said seat S1, characteristically extends from a perimetric edge B1 towards the inside of said shoulder or panel 11.

A pair of half-shells 39, 40, are housed in the vertical holing 36, that can be coupled together and that form a cylindrical casing inside part of which the grub screw 35 is caused to slide by means of a toothed crown 43 of the blocking group GB that can be controlled from the outside by the star tip 54 of a screwdriver 55 (only partially shown).

Said toothed crown 43, which is formed as the head of a threaded screw 44, can rotate in a seat 45 produced on at least one 40 of the two half-shells 39 and 40 when coupled with each other. A hole 42 formed in the first 39 of the two half-shells 39, 40 is aligned with the first horizontal holing 37 of the shoulder 11 and it is possible to act from this on the toothed crown 43 from a first side of the shoulder or panel 11.

The threaded screw 44 is in turn positioned in a threaded axial hole 46 and inside the grub screw 35.

According to the invention, moreover, a second hole 42' is formed in the second 40 of the two half-shells 39, 40 and is also aligned with the first horizontal holing 37 of the shoulder 11. In this way, each half-shell 39, 40 contains at least one hole 42, 42' which is arranged aligned on the two half-shells 39, 40 and which is aligned with the first horizontal holing 37 of the shoulder 11.

It is therefore possible to act on the toothed crown 43 by passing from this second hole 42', i.e. by passing from a side of the shoulder 11 different from the first side mentioned above, normally used.

The components 35,43,44,46 mainly define the blocking group GB suitable for acting on the above-mentioned connection group GC composed of the pin 33, as explained in greater detail hereunder.

The star tip 54 of a screwdriver 55 is suitable for being inserted in a toothed crown 43 passing through the first holing 37 of the shoulder 11 and from the hole 42 of the half-shell 39 thus coupling with the same to cause its rotation.

The rotation of the screwdriver 55 in turn causes the rotation of the toothed crown 43 of the head of the threaded screw 44. The rotation of the threaded screw 44 forces the downward movement of the grub screw 35.

It can thus be seen how, in this embodiment, the joining device of the present invention essentially comprises a blocking group GB (35, 43, 44, 46) inserted inside a seat S1 in the form of an elongated vertical holing 36 of the shoulder 11, which acts on a pin connection group GC 33 to be blocked, positioned inside a seat S2 of the base 12 and which extends from a horizontal holing 30 formed at the side of the base 12 itself. More generally, it is provided, according to the invention, that the blocking group GB be inserted inside a seat S1 completely contained in the thickness SP of the shoulder or panel as desired, wherein the longitudinal axis X of said seat S1 or holing 36 extends perpendicular to the approach direction d and tightening of the base 12 to the shoulder or panel 11.

Returning to the example, the two parts of the joining device according to the present invention are first positioned, by placing the two half-shells 39 and 40 in the holing 36 of the shoulder 11 and the pin 33 in the holing 30 of the base 12, as shown in FIG. 4.

Figures 7, 8, 9:
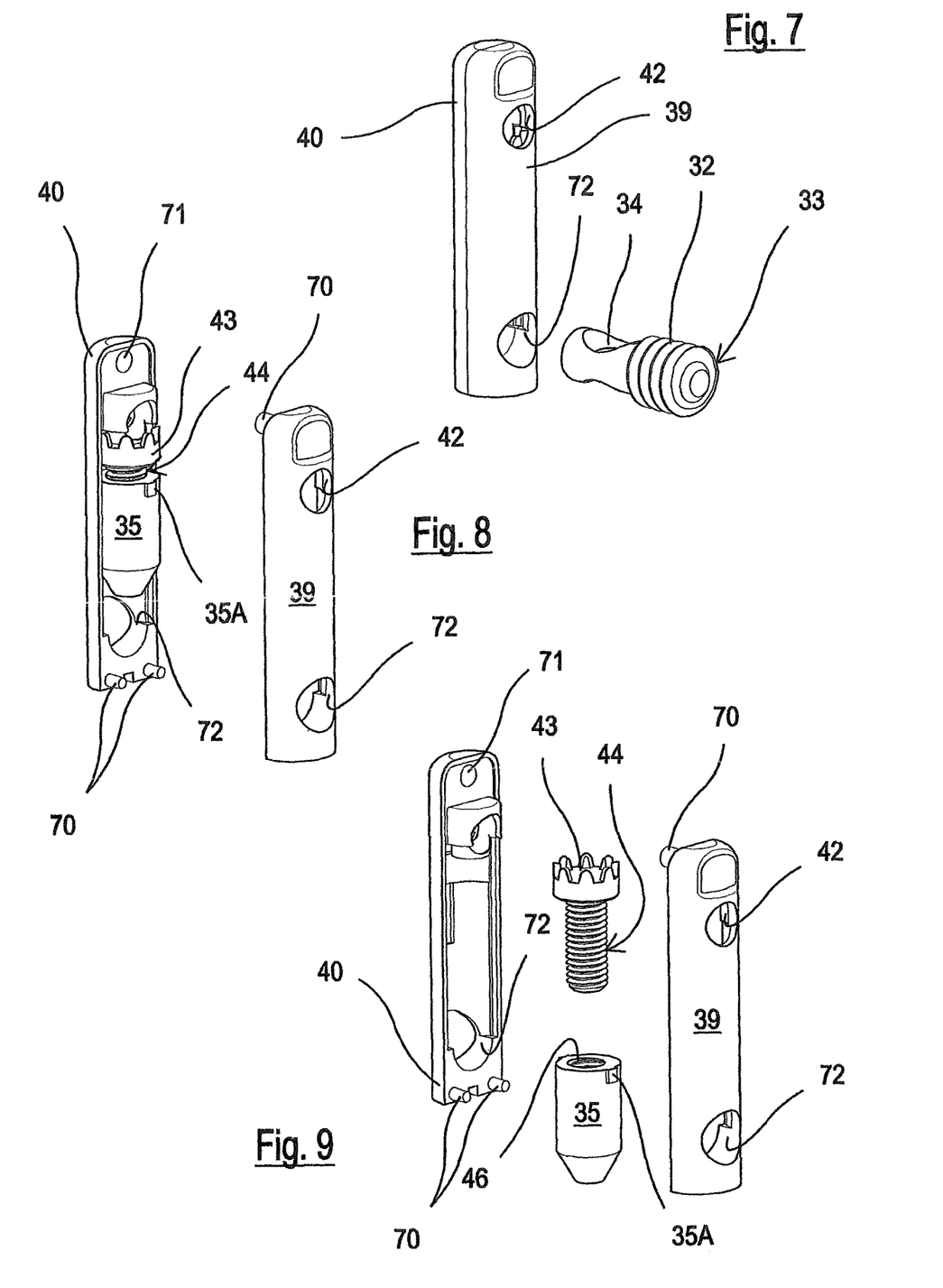
FIGS. 7, 8 and 9 are perspective views, partly with exploded elements, of an example of a blocking group and connection group used in the joining device of the present invention, as shown for example in FIGS. 4 to 6.

To enable this, the grub screw 35 was previously coupled with the relative threaded screw 44, inserted in the threaded hole 46 and containing the toothed crown 43 (shown in FIG. 9). These elements were then positioned in the two half-shells 39 and 40 as shown in FIG. 8 and coupling was effected for closing the same half-shells 39 and 40.

Said coupling is facilitated by the presence of pins 70 protruding from a half-shell 39 or 40 suitable for being snap-inserted in seats 71 specifically formed in the other half-shell 40 or 39.

FIG. 7 shows how the complete assembly of the half-shells 39, 40 has been effected with the relative elements inserted in the same.

The edge B of the base 12 is then moved towards the surface S of the shoulder 11, inserting the protruding part of the pin 33 in the second horizontal holing 38 of the shoulder 11 and then in two aligned holings 72 formed in the two half-shells 39 and 40.

As already specified, the tip 54 of the screwdriver is subsequently inserted passing through the first holing 37 of the shoulder 11 and through the hole 42 of the half-shell 39 so as to be engaged with the toothed crown 43. The rotation of the toothed crown 43 of the head of the threaded screw 44 forces the downward movement of the grub screw 35; for this purpose, the grub screw 35 is provided with blocking means 35A against rotation that allow the translation of the grub screw itself 35, preventing its rotation. The means 35A can consist, for example, of radial protrusions that are coupled inside corresponding seats 35B in at least one of the half-shells 39, 40.

The tip of the grub screw 35 is engaged in the housing 34 of the pin 33 causing tightening between the shoulder 11 and the base 12, as shown in FIG. 6, by moving the base 12 in the direction d which is perpendicular to the longitudinal axis x of the seat S1 or holing 36. FIG. 6 indicates by means of a series of arrows, the scheme of forces at play between the shoulder 11 and base 12 of the piece of furniture and between the parts of the joining device.

Figure 10:
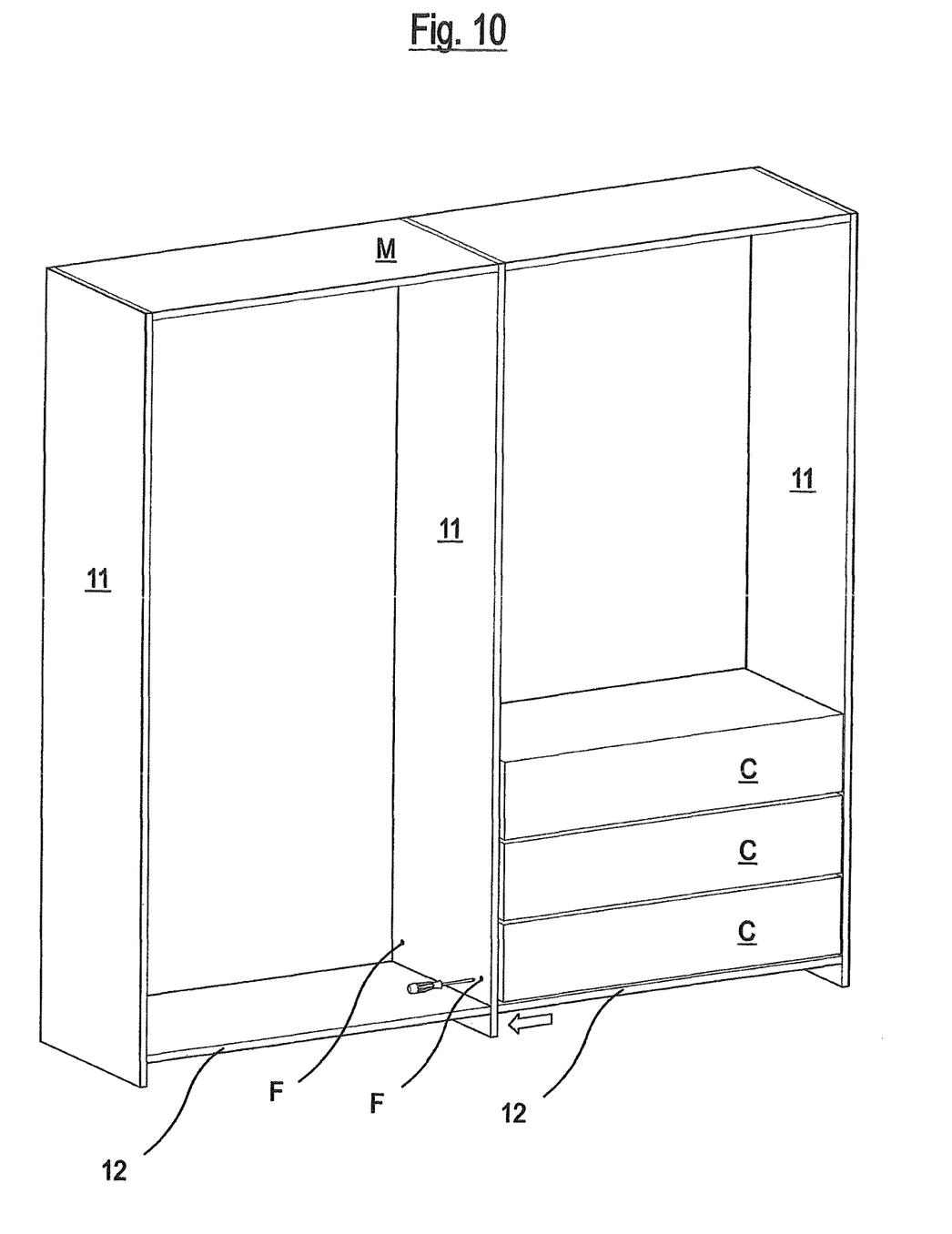
FIG. 10 shows an application example of a device according to the present invention.

FIG. 10 shows how the joining device of the invention is advantageously used in an alternative case of its difficult accessibility.

This problem may arise, for example, in a piece of furniture M in which a central shoulder 11 has a series of drawers C juxtaposed on one of its sides, that hinder access to the wall of the shoulder 11. In this case, the positioning and use of the joining device is quite difficult.

The present invention thus enables a hole F to be produced in the shoulder in correspondence with the hole 42' formed in the second 40 of the two half-shells 39, 40. In this way, it is possible to act on the toothed crown 43 from this hole F and then passing from the hole 42' aligned with the first horizontal holing 37 of the shoulder 11, thus blocking the joining device analogously to what is described above. All of this takes place correspondingly to what is shown in FIGS. 4 to 6.

It can therefore be observed how first of all, with the invention, the problem relating to the visibility of the device has been advantageously solved. The establishment of the actuation area on the shoulder of the furniture creates an aesthetically valid appearance.

Furthermore, possible caps positioned in the holings do not interfere with what is resting on the base of the furniture that is free of any type of holing.

In this way, there are no obstacles on the base for the insertion of any object, eliminating any type of protrusion, even minimum, with respect to the upper surface of the base.

The holings produced on the shoulder are not significantly visible to an observer with respect to holings on the base as in the known art, thus obtaining a high aesthetical value.

Furthermore, the elimination of holes that intersect with each other on the base eliminates any possible weakening of the base itself that can therefore sustain high loads without there being any danger of a possible cause of breakage of the base.

Finally, as already specified and as shown in FIG. 10, the joining device is also accessible from a different side from the usual side (FIGS. 4, 5 and 6) thanks to the presence of the second holing 42' in the half-shell 40 of the device.

The forms of the structure for the production of a joining device of the present invention, as also the materials and assembly modes, can naturally differ from those shown for purely illustrative and non-limiting purposes in the drawings.

The objectives mentioned in the preamble of the description have therefore been achieved.

The protection scope of the present invention is defined by the enclosed claims.

The invention claimed is:

1. A joining device for parts of furniture and furnishing items, the joining device being adapted to couple a first panel to a second panel that move toward each other along an approach direction so as to bring an edge of the second panel abutted against a surface of the first panel, the joining device comprising:
   a blocking group adapted to be lodged within the first panel; and
   a connection group adapted to be attached to the second panel,
   wherein the blocking group is adapted to be inserted inside a longitudinal seat defined in a thickness of the first panel and extending perpendicularly to the approach direction, the blocking group being configured to be actuated from at least one side of the seat,
   wherein the blocking group comprises,
   a threaded screw having a head shaped as a toothed crown and a threaded stem extending from the head,
   a grub screw engaging the threaded stem, and
   a casing housing an entirety of the threaded screw and the grub screw,
   wherein the connection group comprises a pin having a first end and a second end, the second end being threaded and adapted to engage a threaded bush disposed within the second panel,
   wherein the casing has a first opening configured to receive a tool engaging the toothed crown, and a second opening longitudinally aligned with the first opening and configured to receive the first end of the pin,
   whereby a rotation of the toothed crown causes a longitudinal movement of the grub screw toward or away from the pin, so as to engage or disengage the pin.

2. The joining device according to claim 1, wherein the casing is composed of two half shells, wherein at least one groove is defined on an interior wall of at least one of the two half shells, and wherein the grub screw comprises at least one protuberance shaped to be received in the at least one groove so at to define a direction of longitudinal motion of the grub screw.

3. The joining device according to claim 2, wherein two half shells are joined to each other by one or more second pins extending from one of the two half shells and engaging one or more cavities defined in another one of the two half shells.

4. The joining device according to claim 2, wherein at least one of the two half shells has a seat defined therein the supports the toothed crown, thereby preventing a longitudinal movement of the toothed crown toward the grub screw.

5. The joining device according to claim 1, wherein the first end of the pin has a housing defined therein that is configured to receive an end of the threaded stem.

6. The joining device according to claim 1, wherein the casing has a third opening laterally opposite to the first opening and also configured to receive the tool engaging the toothed crown.

7. The joining device according to claim 1, wherein the casing has a fourth opening laterally opposite to the second opening.

* * * * *